P. A. VARVITSIOTIS.
MOISTENER.
APPLICATION FILED JUNE 7, 1916.
1,319,023. Patented Oct. 14, 1919.
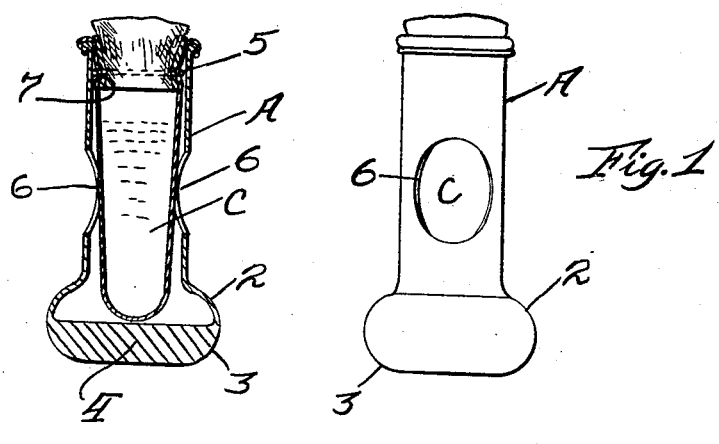
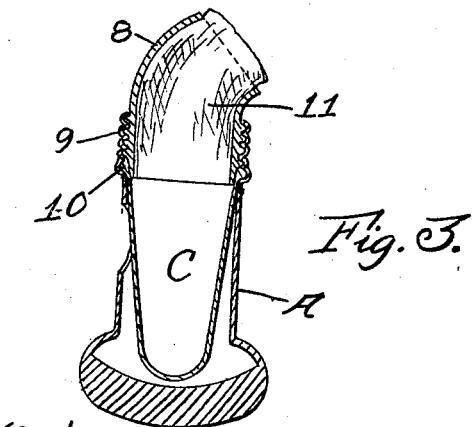
Inventor:
Pericles A. Varvitsiotis.
by: 
Attorney.

UNITED STATES PATENT OFFICE.

PERICLES A. VARVITSIOTIS, OF ST. PAUL, MINNESOTA.

MOISTENER.

1,319,023. Specification of Letters Patent. Patented Oct. 14, 1919.

Application filed June 7, 1916. Serial No. 102,129.

*To all whom it may concern:*

Be it known that I, PERICLES A. VARVITSIOTIS, a subject of Greece, residing at St. Paul, in the county of Ramsey and State of Minnesota, have invented a new and useful Improvement in Moisteners, of which the following is a specification.

The object of this invention is to provide a moistener for the gummed flaps of envelops, postage stamps and the like having a combined reservoir and suction chamber, which will by compressing supply moistening fluid to an absorbent wiper and which by expanding will automatically fill and replenish the fluid.

A further object is to provide means tending to automatically cause the device to stand in upright position, so that the moistening fluid will not leak through the wiper or moistener unintentionally.

A still further object is to provide a holder in combination with the other elements above referred to, which can be used to seal flaps of envelops and stamps by pressure after the gummed surfaces have been moistened.

With these and other objects in view, my invention comprises the features of construction and combination of parts hereinafter more fully described and claimed.

In the accompanying drawing forming part of the specification, Figure 1 is a side elevation of my invention; Fig. 2 is a vertical section, and Fig. 3 is a section of a modification.

In the drawing A represents a holder in the form of a thin cylindrical shell having an enlarged base 2 formed with a curved lower surface 3, said enlarged surface containing a weight 4 formed by a filling of lead or other heavy material and causing the device to act in the same manner as a "witch", the center of gravity being exceedingly low and causing the device to turn into upright position automatically when placed upon its side. Placed in the upper end of the cylindrical shell is a wiper made out of a roll of felt tightly wound or out of any suitable absorbent material, through which water or other moistening fluid will percolate. Coöperating with the wiper is a combined reservoir and suction chamber C in the form of a rubber or other water proof elastic sack or tube closed at its lower end and having its upper end stretched around the roll of felt, thus assisting in holding the roll tightly wound, a cord or band 5 is fastened around the upper portion of the tube and serves to fasten the tube on the wiper and hold the parts tightly secured together. The wiper with the combined reservoir and suction chamber attached is inserted in the outer end of the shell A in much the same manner as a stopper, it being held by the shell with its outer end projecting slightly, so that the entire device can be used for moistening the gummed flaps and surfaces of stamps by rubbing the wiper over said surfaces. The thickness and strength of the wall of the tube is sufficient to tend to hold the tube normally outstanding and filled as shown in the drawing. A layer 7 of cork or other suitable substantially water proof material is laid around the roll of felt under the edge of the rubber tube and serves to prevent water passing through the side of the wiper. The side of the tubular shell is formed with oppositely disposed openings 6, through which the combined reservoir and suction chamber can be compressed to force the liquid outwardly through and to moisten the wiper. To fill the reservoir and suction chamber, the wiper is removed and the reservoir and suction chamber while compressed immersed in the moistening liquid. Upon releasing the reservoir and suction chamber it expands due to its elasticity and draws the water through the moistener and into said chamber, thus replenishing the moistening fluid in the latter. The wiper is then replaced in the holder and the reservoir acts as a fountain to supply moistening liquid to said wiper. The holder protects the receptacle so as not to be compressed accidentally.

When desired, the invention may assume the form disclosed in Fig. 3 of the drawing. In this construction, the upper end of the holder has detachably secured therein by a threaded connection 9, an elbow 8 containing the wiper 11 and the reservoir C is clamped tightly by its edge 10 in the holder A below the elbow. The wiper is thus supported at an angle to the holder and may at times be more convenient for use than when held in the end of the holder as shown in Fig. 1.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claim.

Having described my invention, what I claim as new and desire to protect by Letters Patent is:

A moistening device, comprising, in combination, a thin cylindrical shell, entirely open at one end and enlarged and weighted at its opposite end tending to normally hold the shell erect when at rest, a pervious wiper and an elastic reservoir and suction chamber having a body formed with a large mouth stretched over and detachably secured upon said wiper, said wiper and reservoir forming an elastic plug inserted and held in the open end of said holder with its body depending freely in said shell and said shell having a pair of opposite side openings through which the body of said reservoir and chamber can be compressed to express liquid through said wiper.

In testimony whereof, I have signed my name to this specification.

PERICLES A. VARVITSIOTIS.